United States Patent [19]

Yamamoto et al.

[11] Patent Number: 5,576,392

[45] Date of Patent: Nov. 19, 1996

[54] RESIN COMPOSITION

[75] Inventors: Yohzoh Yamamoto; Masashi Yatoumaru, both of Kuga-gun, Japan

[73] Assignees: Mitsui Petrochemical Industries, Ltd., Tokyo, Japan; Hoechst Aktiengesellschaft, Frankfurt, Germany

[21] Appl. No.: 532,483

[22] Filed: Sep. 22, 1995

[30] Foreign Application Priority Data

Sep. 26, 1994 [JP] Japan .................................. 6-230097

[51] Int. Cl.[6] .......................... C08F 277/00; C08L 45/00; C08L 51/00
[52] U.S. Cl. ........................ 525/289; 525/284; 525/132; 525/178; 525/64
[58] Field of Search ..................... 524/270, 323; 525/64, 132, 178, 284, 289

[56] References Cited

U.S. PATENT DOCUMENTS

| | | | |
|---|---|---|---|
| 4,614,778 | 9/1986 | Kajiura et al. | 526/281 |
| 5,179,171 | 1/1993 | Minami et al. | 525/288 |

FOREIGN PATENT DOCUMENTS 2593820   8/1987   France .

OTHER PUBLICATIONS

Abstract of Jap. Laid-Open Pat. Publ. No. 61-98780 (May 17, 1986).
Abstract of Jap. Laid-Open Pat. Publ. No. 61-115916 (Jun. 3, 1986).
Abstract of Jap. Laid-Open Pat. Publ. No. 61-120816 (Jun. 7, 1986).
Database WPI, Section Ch, Week 9402, Derwent Publ. Ltd.; Abstract of of Japanese Laid-Open Patent Appln. No. 5-320 460 (Dec. 1993).

Primary Examiner—Vasu S. Jagannathan
Attorney, Agent, or Firm—Sherman and Shalloway

[57] ABSTRACT

The resin composition of the present invention comprises (A) a cycloolefin resin selected from the group consisting of a random copolymer of a cycloolefin prepared from a specified cycloolefin such as norbornene or tetracyclododecene, a (co)polymer obtained by a ring-opening polymerization of such a cycloolefin and a product of hydrogenation of the above ring-opening (co)polymer; and (B) an oligomer having an allcyclic structure and/or an aromatic ring structure, e.g., a terpene resin oligomer. Therefore, the resin composition of the present invention is especially excellent in coating and bonding suitabilities.

5 Claims, No Drawings

RESIN COMPOSITION

FIELD OF THE INVENTION

The present invention relates to a resin composition comprising a cycloolefin resin and a specified adhesive oligomer, which is excellent in coating and bonding suitabilities.

BACKGROUND OF THE INVENTION

The applicant of the present application has made various proposals with respect to cycloolefin resins such as cycloolefin-based random copolymers formed of ethylene and specified cycloolefins. For example, such proposals 5 are found in the publication of Japanese Patent Laid-open Publication No. 60(1985)-168708 and the specifications of Japanese Patent Application Nos. 59(1984)-220550, 59(1984)-236828, 59(1984)-236829 and 59(1984)-242336. The cycloolefin resins such as cycloolefin-based random copolymers described in the above publication and specifications not only have excellent transparency but also are excellent in various characteristics such as heat, heat aging, chemical and solvent resistances and dielectric and mechanical properties.

However, the above cycloolefin resins have no polar groups, so that there is room for improvement with respect to their compatibilities with resins having polarity.

In particular, when a coating is applied to any of the cycloolefin resins, it is sometimes difficult to secure the coating to the surface of the cycloolefin resin, depending on the type of the coating. Further, when it is attempted to bond the cycloolefin resin to another resin, satisfactory bonding strength sometimes cannot be realized depending on the type of an adhesive employed.

OBJECT OF THE INVENTION

The object of the present invention is to provide a cycloolefin resin composition improved in coating and bonding suitabilities.

SUMMARY OF THE INVENTION

The resin composition of the present invention comprises:

(A) at least one cycloolefin resin selected from the group consisting of:
  a random copolymer of a cycloolefin represented by the following formula (I) or (II) and ethylene,
  a (co)polymer obtained by a ring-opening polymerization of a cycloolefin represented by the following formula (I) or (II) and
  a product of hydrogenation of said ring-opening (co)polymer, and (B) an oligomer having an alicyclic structure and/or an aromatic ring structure;

Formula (I)

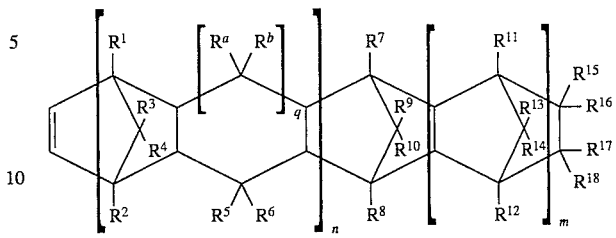

wherein n is 0 or 1, m is 0 or a positive integer, q is 0 or 1 and each of $R^1$ to $R^{18}$, $R^a$ and $R^b$ independently represents a hydrogen atom, a halogen atom or a hydrocarbon group, provided that $R^{15}$ to $R^{18}$ may mutually bond to form a monocyclic or polycyclic ring structure which may contain a double bond, and that a combination of $R^{15}$ and $R^{16}$ or a combination of $R^{17}$ and $R^{18}$ may form an alkylidene group; or Formula (II)

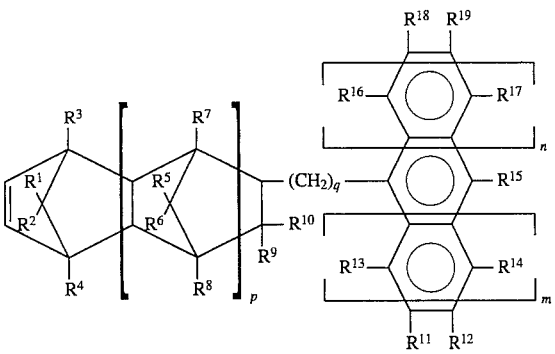

wherein each of p and q is 0 or an integer of 1 or greater, each of m and n is 0, 1 or 2 and each of $R^1$ to $R^{19}$ independently represents a hydrogen atom, a halogen atom, an aliphatic hydrocarbon group, an alicyclic hydrocarbon group, an aromatic hydrocarbon group or an alkoxy group, provided that a carbon atom with which $R^9$ and $R^{10}$ bond and either a carbon atom with which $R^{13}$ bonds or a carbon atom with which $R^{11}$ bonds may bond with each other directly or through an alkylene group having 1 to 3 carbon atoms and that, when n=m=0, a combination of $R^{15}$ and $R^{12}$ or a combination of $R^{15}$ and $R^{19}$ may mutually bond to form a monocyclic or a polycyclic aromatic ring.

The resin composition of the present invention comprises a cycloolefin resin (A) and an oligomer having an alicyclic structure and/or an aromatic ring structure (B), so that it has excellent affinities for coating compositions and adhesives, thereby being excellent in coating and bonding suitabilities.

DETAILED DESCRIPTION OF THE INVENTION

The resin composition of the present invention will be described in greater detail below.

The resin composition of the present invention comprises a cycloolefin resin (A) and an oligomer having an alicyclic structure and/or an aromatic ring structure (B).

The cycloolefin resin (A) for use in the present invention is selected from among:

a random copolymer of a cycloolefin represented by the following formula (I) or (II) and ethylene, a (co)polymer obtained by a ring-opening polymerization of a cycloolefin represented by the following formula (I) or (II) and a product of hydrogenation of the above ring-opening (co)polymer. These may be used either individually or in combination.

The cycloolefin employed to form the cycloolefin resin according to the present invention is represented by the following formula (I) or (II).

Formula (I)

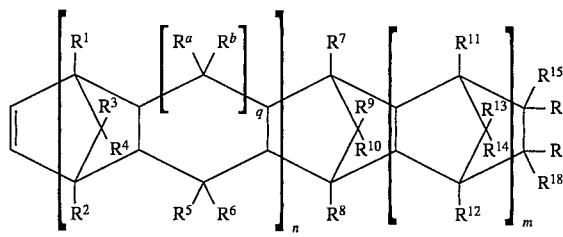

In the above formula (I), n is 0 or 1, m is 0 or a positive integer and q is 0 or 1. When q is 1, the ring represented with the use of q is a 6-membered ring. On the other hand, when q is 0, it is a 5-membered ring. Each of $R^1$ to $R^{18}$, $R^a$ and $R^b$ independently represents a hydrogen atom, a halogen atom or a hydrocarbon group.

The halogen atom is selected from among fluorine, chlorine, bromine and iodine atoms. The hydrocarbon group is generally selected from among alkyl groups each having 1 to 20 carbon atoms, halogenated alkyl groups each having 1 to 20 carbon atoms and cycloalkyl and aromatic hydrocarbon groups each having 3 to 15 carbon atoms. Examples of the above alkyl groups include methyl, ethyl, propyl, isopropyl, amyl, hexyl, octyl, decyl, dodecyl and octadecyl groups. These alkyl groups may be those substituted with halogen atoms. An example of the above cycloalkyl group is cyclohexyl. Examples of the above aromatic hydrocarbon groups include phenyl and naphthyl groups. In the above formula (I), $R^{15}$ may mutually bond (cooperate) with $R^{16}$, $R^{17}$ with $R^{18}$ $R^{15}$ with $R^{17}$ $R^{16}$ with $R^{18}$ $R^{15}$ with $R^{18}$ and $R^{16}$ with $R^{17}$ to form a monocyclic ring or polycyclic rings. The thus formed monocyclic ring or polycyclic rings may have a double bond. Examples of the above monocyclic ring and polycyclic ring groups include the following groups:

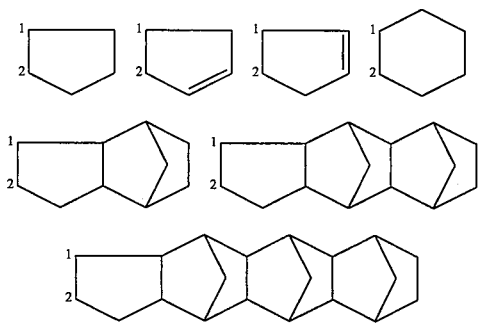

In the above examples of groups, the carbon atoms having numerals 1 and 2 affixed thereto respectively correspond to those with which $R^{15}$ ($R^{16}$) and $R^{17}$ ($R^{18}$) bond in the formula (I). $R^{15}$ may cooperate with $R^{16}$ and $R^{17}$ with $R^{18}$ to thereby form an alkylidene group. This alkylidene group generally has 2 to 20 carbon atoms. Examples of the above alkylidene groups include ethylidene, propylidene and isopropylidene groups.

Formula (II)

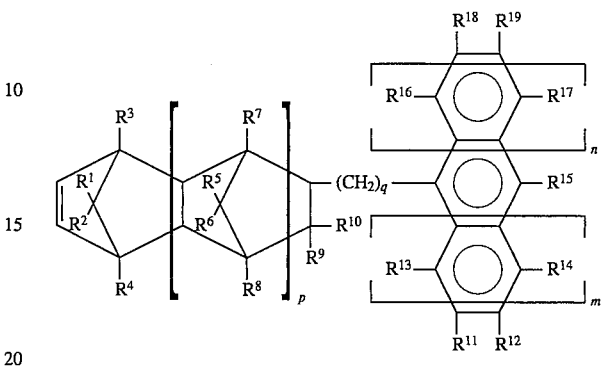

In the above formula (II), each of p and q is 0 or a positive integer, and each of m and n is 0, 1 or 2.

Each of $R^1$ to $R^{19}$ independently represents a hydrogen atom, a halogen atom, an aliphatic hydrocarbon group, an alicyclic hydrocarbon group, an aromatic hydrocarbon group or an alkoxy group.

The halogen atom is selected from among those mentioned above with respect to the formula (I).

The hydrocarbon group is generally selected from among alkyl groups each having 1 to 20 carbon atoms and cycloalkyl and aromatic hydrocarbon groups each having 3 to 15 carbon atoms. Examples of the above alkyl groups include methyl, ethyl, propyl, isopropyl, amyl, hexyl, octyl, decyl, dodecyl and octadecyl groups. These alkyl groups may be those substituted with halogen atoms. An example of the above cycloalkyl group is cyclohexyl. Examples of the above aromatic hydrocarbon groups include aryl and aralkyl groups such as phenyl, tolyl, naphthyl, benzyl and phenylethyl groups. Examples of the above alkoxy groups include methoxy, ethoxy and propoxy groups.

In the above formula (II), the carbon atom with which $R^9$ and $R^{10}$ bond and either the carbon atom with which $R^{13}$ bonds or the carbon atom with which $R^{11}$ bonds may bond with each other directly or through an alkylene group having 1 to 3 carbon atoms. When two carbon atoms bond with each other through an alkylene group, either $R^9$ cooperates with $R^{13}$ or $R^{10}$ with $R^{11}$ to thereby form an alkylene group selected from among methylene (—CH$_2$—), ethylene (—CH$_2$CH$_2$—) and propylene (—CH$_2$CH$_2$CH$_2$—).

When n=m=0, a combination of $R^{15}$ and $R^{12}$ or a combination of $R^{15}$ and $R^{19}$ may mutually bond to form a monocyclic or a polycyclic aromatic ring. Examples of the aromatic rings formed by $R^{15}$ and $R^{12}$ when n=m=0 are as follows:

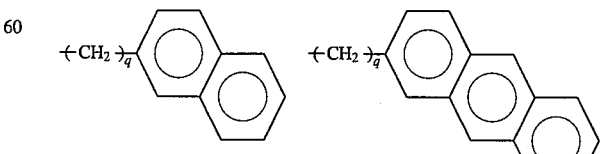

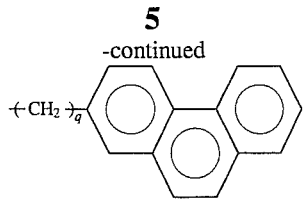

In the above formulae, q has the same meaning as in the formula (II).

Examples of the cycloolefins represented by the above formulae (I) and (II) include
- bicyclo-2-heptene derivatives (bicyclohept-2-ene derivatives),
- tricyclo-3-decene derivatives,
- tricyclo-3-undecene derivatives,
- tetracyclo-3-dodecene derivatives,
- pentacyclo-4-pentadecene derivatives,
- pentacyclopentadecadiene derivatives,
- pentacyclo-3-pentadecene derivatives,
- pentacyclo-3-hexadecene derivatives,
- pentacyclo-4-hexadecene derivatives,
- hexacyclo-4-heptadecene derivatives,
- heptacyclo-5-eicocene derivatives,
- heptacyclo-4-eicocene derivatives,
- heptacyclo-5-heneicocene derivatives,
- octacyclo-5-dococene derivatives,
- nonacyclo-5-pentacocene derivatives,
- nonacyclo-6-hexacocene derivatives, cyclopentadiene-acenaphthylene adducts,
- 1,4-methano-1,4,4a, 9a-tetrahydrofluorene derivatives, and
- 1,4-methano-1,4,4a, 5,10,10a-hexahydroanthracene derivatives.

Preferred examples of these cycloolefins represented by the above formulae (I) and (II) include:

The bicyclo[2.2.1]hept-2-ene derivatives such as:

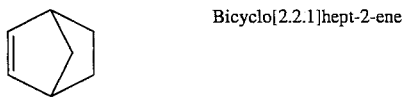
Bicyclo[2.2.1]hept-2-ene

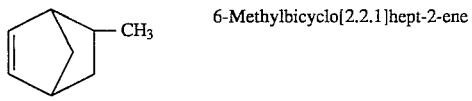
6-Methylbicyclo[2.2.1]hept-2-ene

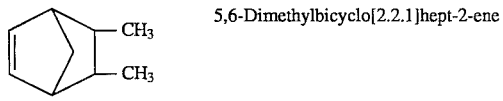
5,6-Dimethylbicyclo[2.2.1]hept-2-ene

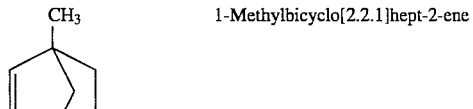
1-Methylbicyclo[2.2.1]hept-2-ene

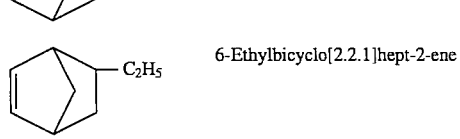
6-Ethylbicyclo[2.2.1]hept-2-ene

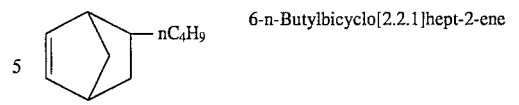
6-n-Butylbicyclo[2.2.1]hept-2-ene

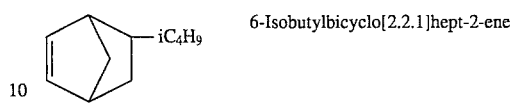
6-Isobutylbicyclo[2.2.1]hept-2-ene

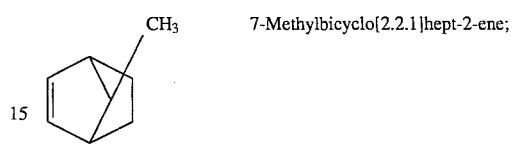
7-Methylbicyclo[2.2.1]hept-2-ene;

the tetrocyclo[4.4.0.1$^{2,5}$.1$^{7,10}$]-3-dodecene derivatives such as:

Tetracyclo[4.4.0.1$^{2,5}$.1$^{7,10}$]-3-dodecene,

8-Methyltetracyclo[4.4.0.1$^{2,5}$.1$^{7,10}$]-3-dodecene

8-Ethyltetracyclo[4.4.0.1$^{2,5}$.1$^{7,10}$]-3-dodecene

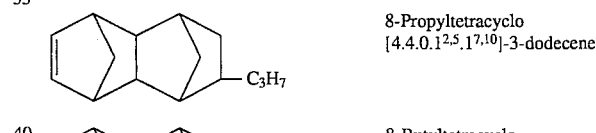
8-Propyltetracyclo[4.4.0.1$^{2,5}$.1$^{7,10}$]-3-dodecene

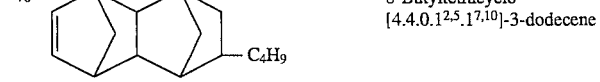
8-Butyltetracyclo[4.4.0.1$^{2,5}$.1$^{7,10}$]-3-dodecene

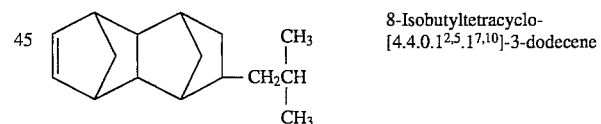
8-Isobutyltetracyclo-[4.4.0.1$^{2,5}$.1$^{7,10}$]-3-dodecene

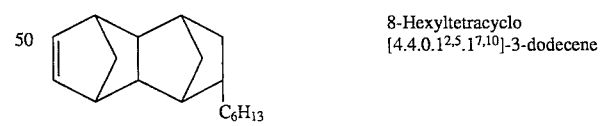
8-Hexyltetracyclo[4.4.0.1$^{2,5}$.1$^{7,10}$]-3-dodecene

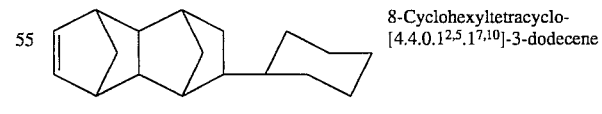
8-Cyclohexyltetracyclo-[4.4.0.1$^{2,5}$.1$^{7,10}$]-3-dodecene

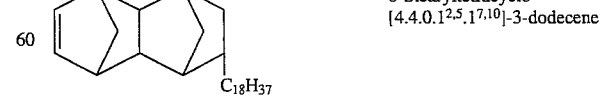
8-Stearyltetracyclo-[4.4.0.1$^{2,5}$.1$^{7,10}$]-3-dodecene

| Structure | Name |
|---|---|
| (structure) | 5,10-Dimethyltetracyclo-[4.4.0.1²,⁵.1⁷,¹⁰]-3-dodecene |
| (structure) | 2,10-Dimethyltetracyclo-[4.4.0.1²,⁵.1⁷,¹⁰]-3-dodecene |
| (structure) | 8,9-Dimethyltetracyclo-[4.4.0.1²,⁵.1⁷,¹⁰]-3-dodecene |
| (structure) | 8-Ethyl-9-methyltetracyclo-[4.4.0.1²,⁵.1⁷,¹⁰]-3-dodecene |
| (structure) | 11,12-Dimethyltetracyclo-[4.4.0.1²,⁵.1⁷,¹⁰]-3-dodecene |
| (structure) | 2,7,9-Trimethyltetracyclo-[4.4.0.1²,⁵.1⁷,¹⁰]-3-dodecene |
| (structure) | 9-Ethyl-2,7-dimethyltetracyclo-[4.4.0.1²,⁵.1⁷,¹⁰]-3-dodecene |
| (structure) | 9-Isobutyl-2,7-dimethyltetracyclo-[4.4.0.1²,⁵.1⁷,¹⁰]-3-dodecene |
| (structure) | 9,11,12-Trimethyl-tetracyclo-[4.4.0.1²,⁵.1⁷,¹⁰]-3-dodecene |
| (structure) | 9-Ethyl-11,12-dimethyltetracyclo-[4.4.0.1²,⁵.1⁷,¹⁰]-3-dodecene |
| (structure) | 9-Isobutyl-11,12-dimethyltetracyclo-[4.4.0.1²,⁵.1⁷,¹⁰]-3-dodecene |
| (structure) | 5,8,9,10-Tetramethyltetracyclo-[4.4.0.1²,⁵.1⁷,¹⁰]-3-dodecene |
| (structure) | 8-Ethylidenetetracyclo-[4.4.0.1²,⁵.1⁷,¹⁰]-3-dodecene |
| (structure) | 8-Ethylidene-9-methyltetracyclo-[4,4,0,1²,⁵.1⁷,¹⁰]-3-dodecene |
| (structure) | 8-Ethylidene-9-ethyltetracyclo-[4.4.0.1²,⁵.1⁷,¹⁰]-3-dodecene |
| (structure) | 8-Ethylidene-9-isopropyltetracyclo-[4.4.0.1²,⁵.1⁷,¹⁰]-3-dodecene |
| (structure) | 8-Ethylidene-9-butyltetracyclo-[4.4.0.1²,⁵.1⁷,¹⁰]-3-dodecene |
| (structure) | 8-n-Propylidenetetracyclo-[4.4.0.1²,⁵.1⁷,¹⁰]-3-dodecene |
| (structure) | 8-n-Propylidene-9-methyltetracyclo-[4.4.0.1²,⁵.1⁷,¹⁰]-3-dodecene |
| (structure) | 8-n-Propylidene-9-ethyltetracyclo-[4.4.0.1²,⁵.1⁷,¹⁰]-3-dodecene |
| (structure) | 8-n-Propylidene-9-isopropyltetracyclo-[4.4.0.1²,⁵.1⁷,¹⁰]-3-dodecene |
| (structure) | 8-n-Propylidene-9-butyltetracyclo-[4.4.0.1²,⁵.1⁷,¹⁰]-3-dodecene |
| (structure) | 8-Isopropylidene-tetracyclo-[4.4.0.1²,⁵.1⁷,¹⁰]-3-dodecene |

| | |
|---|---|
| 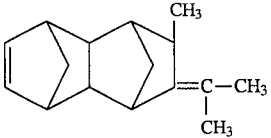 | 8-Isopropylidene-9-methyltetracyclo-[4.4.0.1$^{2,5}$.1$^{7,10}$]-3-dodecene |
| 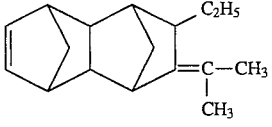 | 8-Isopropylidene-9-ethyltetracyclo-[4.4.0.1$^{2,5}$.1$^{7,10}$]-3-dodecene |
| 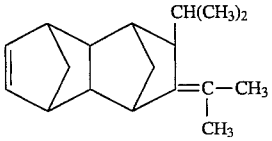 | 8-Isopropylidene-9-isopropyltetracyclo-[4.4.0.1$^{2,5}$.1$^{7,10}$]-3-dodecene |
| 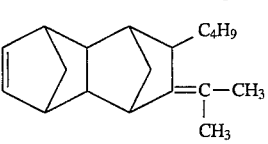 | 8-Isopropylidene-9-butyltetracyclo-[4.4.0.1$^{2,5}$.1$^{7,10}$]-3-dodecene; |
| 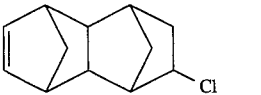 | 8-Chlorotetracyclo[4.4.0.1$^{2,5}$.1$^{7,10}$]-3-dodecene |
| 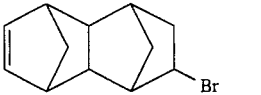 | 8-Bromotetracyclo[4.4.0.1$^{2,5}$.1$^{7,10}$]-3-dodecene |
| 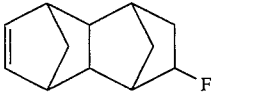 | 8-Fluorotetracyclo[4.4.0.1$^{2,5}$.1$^{7,10}$]-3-dodecene |
| 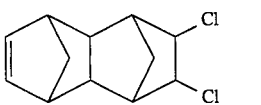 | 8,9-Dichlorotetracyclo-[4.4.0.1$^{2,5}$.1$^{7,10}$]-3-dodecene | the hexacyclo[6.6.1.1$^{3,6}$.1$^{10,13}$.0$^{2,7}$.0$^{9,14}$]-4-heptadecene derivatives such as:

| | |
|---|---|
| 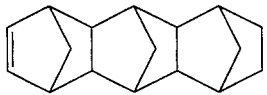 | Hexacyclo[6.6.1.1$^{3,6}$.1$^{10,13}$.0$^{2,7}$.0$^{9,14}$]-4-heptadecene |
| 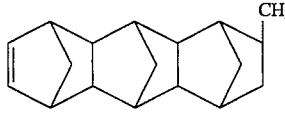 | 12-Methylhexacyclo[6.6.1.1$^{3,6}$.1$^{10,13}$.0$^{2,7}$.0$^{9,14}$]-4-heptadecene |
| 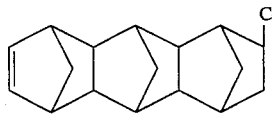 | 12-Ethylhexacyclo[6.6.1.1$^{3,6}$.1$^{10,13}$.0$^{2,7}$.0$^{9,14}$]-4-heptadecene |
| 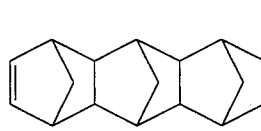 | 12-Isobutylhexacyclo[6.6.1.1$^{3,6}$.1$^{10,13}$.0$^{2,7}$.0$^{9,14}$]-4-heptadecene |
| 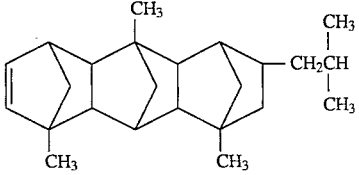 | 1,6,10-Trimethyl-12-isobutylhexacyclo[6.6.1.1$^{3,6}$.1$^{10,13}$.0$^{2,7}$.0$^{9,14}$]-4-heptadecene; | the octacyclo[8.8.0.1$^{2,9}$.1$^{4,7}$.1$^{11,18}$.1$^{13,16}$.0$^{3,8}$.0$^{12,17}$]-5-docosene derivatives such as:

| | |
|---|---|
|  | Octacyclo[8.8.0.1$^{2,9}$.1$^{4,7}$.1$^{11,18}$.1$^{13,16}$.0$^{3,8}$.0$^{12,17}$]-5-docosene |
| 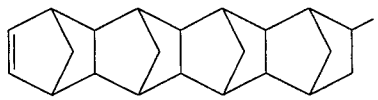 | 15-Methyl-octacyclo[8.8.0.1$^{2,9}$.1$^{4,7}$.1$^{11,18}$.1$^{13,16}$.0$^{3,8}$.0$^{12,17}$]-5-docosene |
|  | 15-Ethyl-octacyclo[8.8.0.1$^{2,9}$.1$^{4,7}$.1$^{11,18}$.1$^{13,16}$.0$^{3,8}$.0$^{12,17}$]-5-docosene; | the pentacyclo[6.6.1.1$^{3,6}$.0$^{2,7}$.0$^{9,14}$]-4-hexadecene derivatives such as:

| | |
|---|---|
| 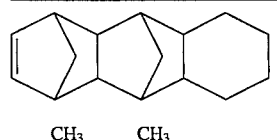 | Pentacyclo[6.6.1.1$^{3,6}$.0$^{2,7}$.0$^{9,14}$]-4-hexadecene |
| 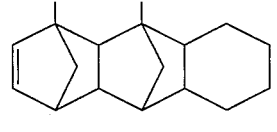 | 1,3-Dimethylpentacyclo-[6.6.1.1$^{3,6}$.0$^{2,7}$.0$^{9,14}$]-4-hexadecene |
| 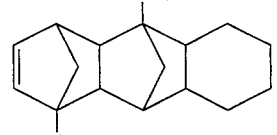 | 1,6-Dimethylpentacyclo-[6.6.1.1$^{3,6}$.0$^{2,7}$.0$^{9,14}$]-4-hexadecene |
| 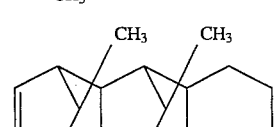 | 15,16-Dimethylpentacyclo-[6.6.1.1$^{3,6}$.0$^{2,7}$.0$^{9,14}$]-4-hexadecene; | the hepacyclo-5-eicosene derivatives or heptacyclo-5-heneicosene derivatives such as:

Heptacyclo[8.7.0.1^{2,9}.1^{4,7}.1^{11,17}.0^{3,8}.0^{12,16}]-5-eicosene;

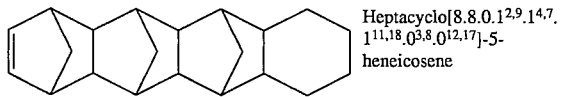
Heptacyclo[8.8.0.1^{2,9}.1^{4,7}.1^{11,18}.0^{3,8}.0^{12,17}]-5-heneicosene the tricyclo[4.3.0.1^{2,5}]-3-decene derivatives such as:

Tricyclo[4.3.0.1^{2,5}]-3-decene,

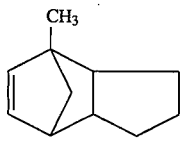
2-Methyltricyclo[4.3.0.1^{2,5}]-3-decene

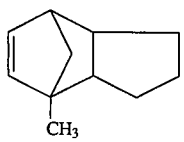
5-Methyltricyclo[4.3.0.1^{2,5}]-3-decene;

the tricyclo[4.4.0.1^{2,5}]-3-undecene derivatives such as:

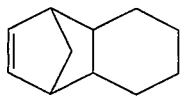
Tricyclo[4.4.0.1^{2,5}]-3-undecene

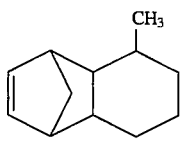
10-Methyltricyclo[4.4.0.1^{2,5}]-3-undecene;

the pentacyclo[6.5.1.1^{3,6}.0^{2,7}.0^{9,13}]-4-pentadecene derivatives such as:

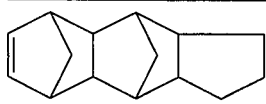
Pentacyclo[6.5.1.1^{3,6}.0^{2,7}.0^{9,13}]-4-pentadecene

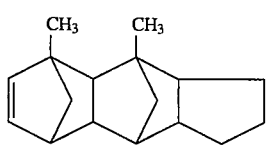
1,3-Dimethylpentacyclo-[6.5.1.1^{3,6}.0^{2,7}.0^{9,13}]-4-pentadecene

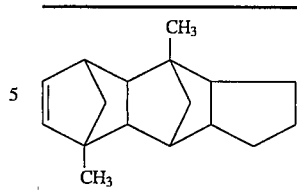
1,6-Dimethylpentacyclo-[6.5.1.1^{3,6}.0^{2,7}.0^{9,13}]-4-pentadecene

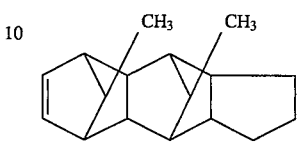
14,15-Dimethylpentacyclo[6.5.1.1^{3,6}.0^{2,7}.0^{9,13}]-4-pentadecene;

the diene derivatives such as:

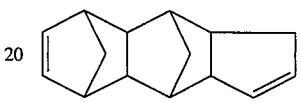
Pentacyclo[6.5.1.1^{3,6}.0^{2,7}.0^{9,13}]-4,10-pentadecadiene;

the pentacyclo[7.4.0.1^{2,5}.1^{9,12}.0^{8,13}]-3-pentadecene derivatives such as:

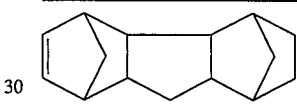
Pentacyclo[7.4.0.1^{2,5}.1^{9,12}.0^{8,13}]-3-pentadecene

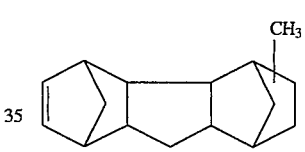
Methyl-substituted pentacyclo[7.4.0.1^{2,5}.1^{9,12}.0^{8,13}]-3-pentadecene;

the heptacyclo[8.7.0.1^{3,6}.1^{10,17}.1^{12,15}.0^{2,7}.0^{11,16}]-4-eicosene derivatives such as:

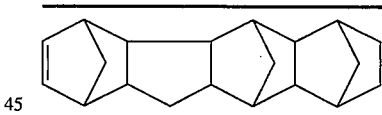
Heptacyclo[8.7.0.1^{3,6}.1^{10,17}.1^{12,15}.0^{2,7}.0^{11,16}]-4-eicosene

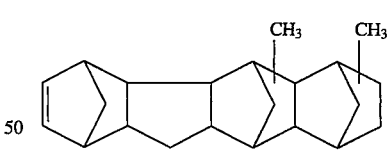
Dimethyl-substituted heptacyclo[8.7.0.1^{3,6}.1^{10,17}.1^{12,15}.0^{2,7}.0^{11,16}]-4-eicosene;

the nonacyclo[10.9.1.1^{4,7}.1^{13,20}.1^{15,18}.0^{3,8}.0^{2,10}.0^{12,21}.0^{14,19}]-5-pentacosene derivatives such as:

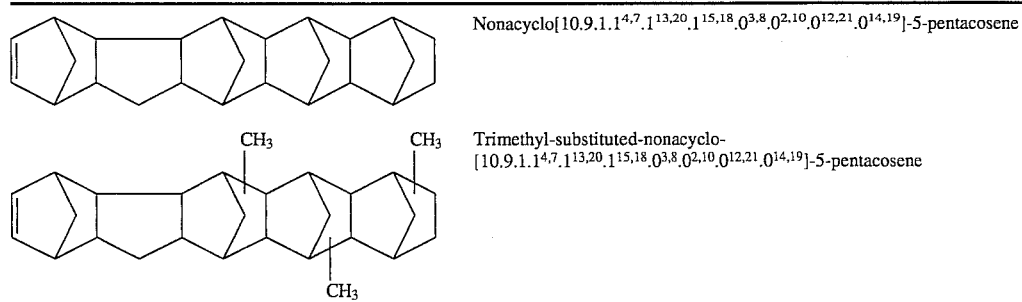

Nonacyclo[10.9.1.1$^{4,7}$.1$^{13,20}$.1$^{15,18}$.0$^{3,8}$.0$^{2,10}$.0$^{12,21}$.0$^{14,19}$]-5-pentacosene Trimethyl-substituted-nonacyclo-[10.9.1.1$^{4,7}$.1$^{13,20}$.1$^{15,18}$.0$^{3,8}$.0$^{2,10}$.0$^{12,21}$.0$^{14,19}$]-5-pentacosene the pentacyclo[8.4.0.1$^{2,5}$.1$^{9,12}$.0$^{8,13}$]-3-hexadecene derivatives such as:

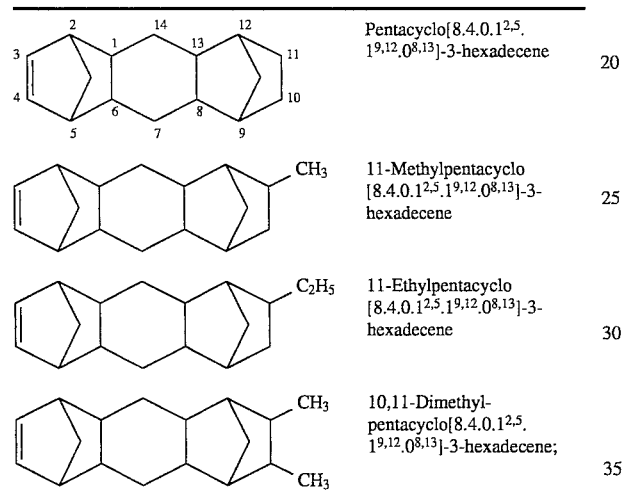

Pentacyclo[8.4.0.1$^{2,5}$.1$^{9,12}$.0$^{8,13}$]-3-hexadecene

11-Methylpentacyclo[8.4.0.1$^{2,5}$.1$^{9,12}$.0$^{8,13}$]-3-hexadecene

11-Ethylpentacyclo[8.4.0.1$^{2,5}$.1$^{9,12}$.0$^{8,13}$]-3-hexadecene 10,11-Dimethyl-pentacyclo[8.4.0.1$^{2,5}$.1$^{9,12}$.0$^{8,13}$]-3-hexadecene;

the hepacyclo[8.8.0.1$^{4,7}$.1$^{11,18}$.1$^{13,16}$.0$^{3,8}$.0$^{12,17}$]-5-heneicosene derivatives such as:

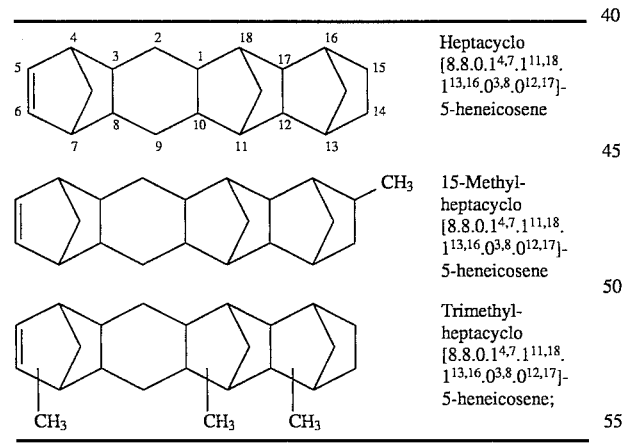

Heptacyclo[8.8.0.1$^{4,7}$.1$^{11,18}$.1$^{13,16}$.0$^{3,8}$.0$^{12,17}$]-5-heneicosene 15-Methyl-heptacyclo[8.8.0.1$^{4,7}$.1$^{11,18}$.1$^{13,16}$.0$^{3,8}$.0$^{12,17}$]-5-heneicosene Trimethyl-heptacyclo[8.8.0.1$^{4,7}$.1$^{11,18}$.1$^{13,16}$.0$^{3,8}$.0$^{12,17}$]-5-heneicosene;

the nonacyclo[10.10.1.1$^{5,8}$.1$^{14,21}$.1$^{16,19}$.0$^{2,11}$.0$^{4,9}$.0$^{13,22}$.0$^{15,20}$]-5-hexacosene derivatives such as:

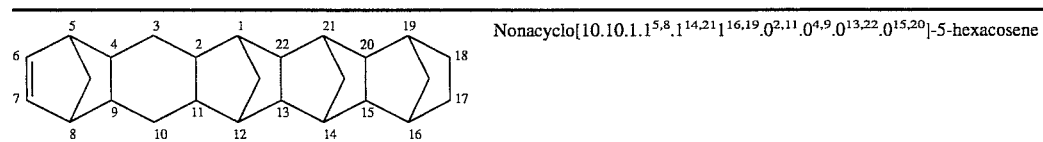

Nonacyclo[10.10.1.1$^{5,8}$.1$^{14,21}$.1$^{16,19}$.0$^{2,11}$.0$^{4,9}$.0$^{13,22}$.0$^{15,20}$]-5-hexacosene

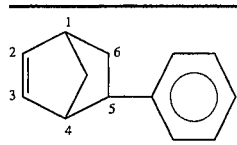 5-Phenyl-bicyclo[2.2.1]hept-2-ene
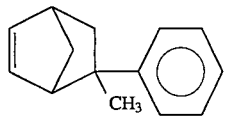 5-Methyl-5-phenyl-bicyclo[2.2.1]-hept-2-ene
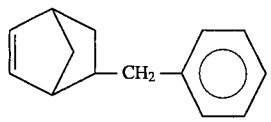 5-Benzyl-bicyclo[2.2.1]hept-2-ene
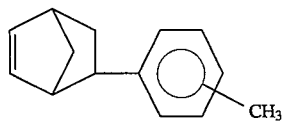 5-Tolyl-bicyclo[2.2.1]hept-2-ene
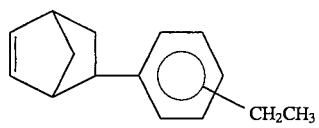 5-(Ethylphenyl)-bicyclo[2.2.1]hept-2-ene
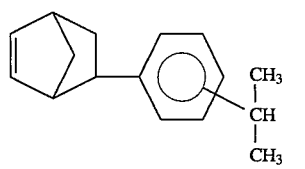 5-(Isopropylphenyl)-bicyclo[2.2.1]-hept-2-ene
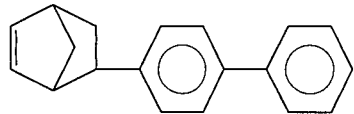 5-(Biphenyl)-bicyclo[2.2.1]hept-2-ene
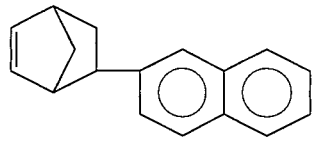 5-(β-Naphthyl)-bicyclo[2.2.1]hept-2-ene
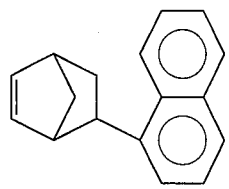 5-(α-Naphthyl)-bicyclo[2.2.1]hept-2-ene
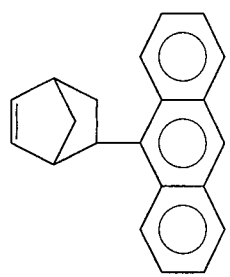 5-(Anthracenyl)-bicyclo[2.2.1]hept-2-ene -continued

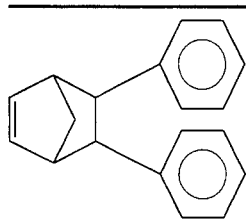
5,6-Diphenyl-bicyclo[2.2.1]hept-2-ene

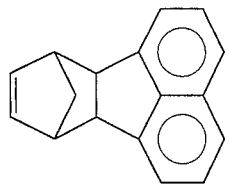
Cyclopentadiene-acenaphthylene adducts

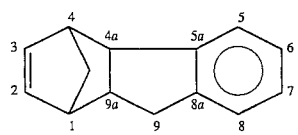
1,4-Methano-1,4,4a,9a-tetrahydro-fluorene

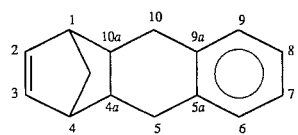
1,4-Methano-1,4,4a,5,10,10a-hexahydroanthracene

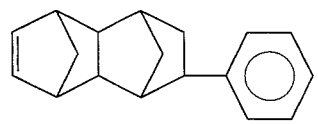
8-Phenyltetracyclo[4.4.0.0$^{3,5}$.1$^{7,10}$]-3-dodecene

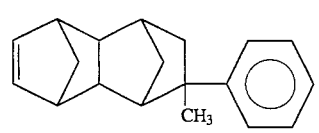
8-Methyl-8-phenyl-tetracyclo[4.4.0.0$^{3,5}$.1$^{7,10}$]-3-dodecene

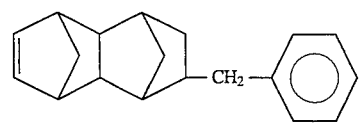
8-Benzyl-tetracyclo[4.4.0.0$^{3,5}$.1$^{7,10}$]-3-dodecene

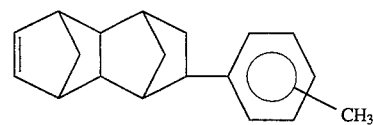
8-Tolyl-tetracyclo[4.4.0.0$^{3,5}$.1$^{7,10}$]-3-dodecene

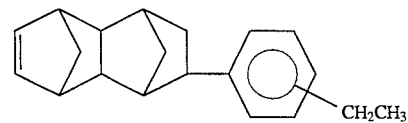
8-(Ethylphenyl)-tetracyclo[4.4.0.0$^{3,5}$.1$^{7,10}$]-3-dodecene

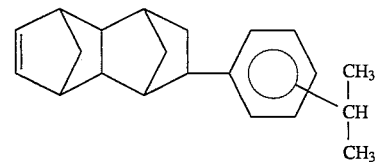
8-(Isopropylphenyl)tetracyclo[4.4.0.0$^{3,5}$.1$^{7,10}$]-3-dodecene

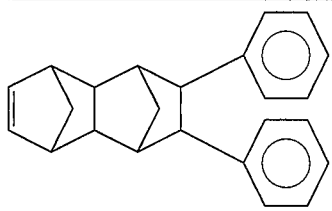 8,9-Diphenyl-tetracyclo[4.4.0.0$^{2,5}$.1$^{7,10}$]-3-dodecene

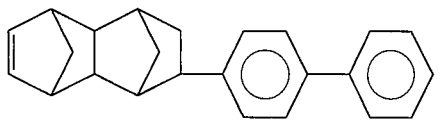 8-(Biphenyl)-tetracyclo[4.4.0.0$^{2,5}$.1$^{7,10}$]-3-dodecene

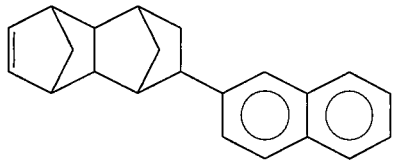 8-(β-Naphthyl)-tetracyclo[4.4.0.1$^{2,5}$.1$^{7,10}$]-3-dodecene

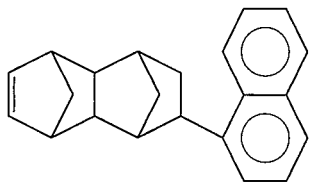 8-(α-Naphthyl)-tetracyclo[4.4.0.1$^{2,5}$.1$^{7,10}$]-3-dodecene

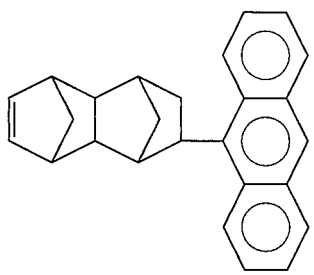 8-(Anthracenyl)-tetracyclo[4.4.0.1$^{2,5}$.1$^{7,10}$]-3-dodecene

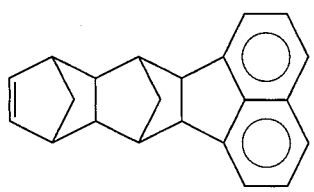 Compound of cyclopentadiene-acenaphthylene adducts with cyclopentadiene further added

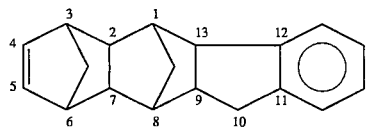 11,12-Benzo-pentacyclo[6.5.1.1$^{3,6}$.0$^{2,7}$.0$^{9,13}$]-4-pentadecene

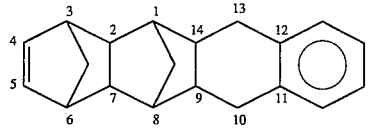 11,12-Benzo-pentacyclo[6.5.1.1$^{3,6}$.0$^{2,7}$.0$^{9,13}$]-4-hexadecene

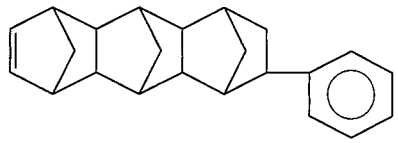 11-Phenyl-hexacyclo[6.6.1.1$^{3,6}$.1$^{10,13}$.0$^{2,7}$.0$^{9,14}$]-4-heptadecene

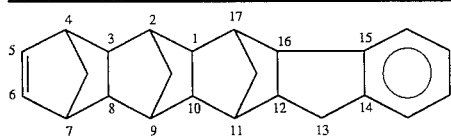

14,15-Benzo-heptacyclo[8.7.0.1²,⁹.1⁴,⁷.1¹¹,¹⁷.0³,⁸.0¹²,¹⁶]-5-eicosene

What cooperates with the above cycloolefin to thereby form a cycloolefin-based random copolymer is ethylene.

The cycloolefin-based random copolymer may further comprise structural units derived from a copolymerizable monomer other than the above ethylene and cycloolefin in an amount not detrimental to the object of the present invention, generally not greater than 20 mol %, preferably not greater than 10 mol %.

Examples of the above other monomers include:

α-olefins each having 3 to 20 carbon atoms such as propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene and 1-eicocene, cycloolefins such as cyclobutene, cyclopentene, cyclohexene, 3,4-dimethylcyclopentene, 3-methylcyclohexene, 2-(2-methylbutyl)-1-cyclohexene, cyclooctene and 3a,5,6,7a-tetrahydro-4,7-methano-1H-indene;

norbornenes such as 2-norbornene, 5-methyl-2-norbornene, 5-ethyl-2-norbornene, 5-isopropyl-2-norbornene, 5-n-butyl-2-norbornene, 5-isobutyl-2-norbornene, 5,6-dimethyl-2-norbornene, 5-chloro-2-norbornene and 5-fluoro-2-norbornene, and nonconjugated dienes such as 1,4-hexadiene, 4-methyl-1,4-hexadiene, 5-methyl-1,4-hexadiene, 1,7-octadiene, dicyclopentadiene, 5-ethylidene-2-norbornene and 5-vinyl-2-norbornene.

The above other monomers can be used either individually or in combination.

In the cycloolefin-based random copolymer, it is believed that the cycloolefins represented by the above formulae (I) and (II) form repeating structural units represented by the following formulae (III) and (IV), respectively.

Formula (III)

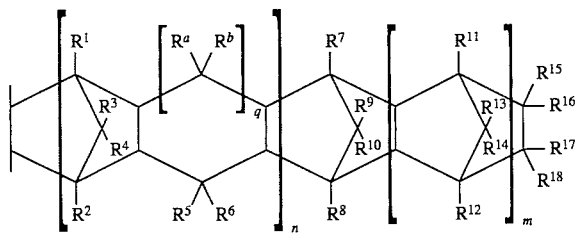

In the above formula (III), m, n, q, $R^1$ to $R^{18}$ $R^a$ and $R^b$ have the same meaning as in the formula (I).

Formula (IV)

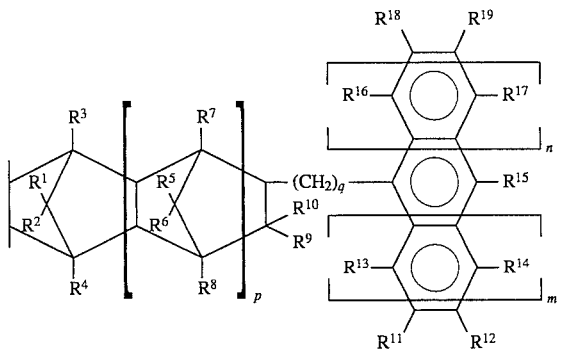

In the above formula (IV), n, m, p, q and R1 to $R^{19}$ have the same meaning as in the formula (II).

In the cycloolefin-based random copolymer, the repeating units derived from ethylene are contained in an amount generally ranging from 40 to 90 mol %, preferably from 50 to 85 mol %. The repeating units derived from the cycloolefin are contained in an amount generally ranging from 10 to 60 mol %, preferably from 15 to 50 mol %. The repeating units derived from ethylene and the repeating units derived from the cycloolefin are arranged randomly in substantially linear form.

The cycloolefin-based random copolymer can be produced, for example, by polymerizing ethylene and the above cycloolefin in a hydrocarbon solvent or a cycloolefin being liquid at reaction temperature which is selected from among the above cycloolefins in the presence of a catalyst composed of a hydrocarbon-soluble vanadium compound and an organoaluminum compound or a catalyst composed of a Group IV or lanthanide transition metal compound containing a ligand having a cyclopentadienyl skeleton and an organoaluminum oxy compound optionally together with an organoaluminum compound.

The above method of polymerization per se is conventional, and the desired random copolymer can be produced under appropriately selected conditions according to any of the processes proposed by the applicant of the present application as described in the publications of Japanese Patent Laid-open Publication Nos. 60(1985)-168708, 61(1986)-120816, 61(1986)-115912, 61(1986)-115916, 61(1986)-271308, 61(1986)-272216, 62(1987)-252406 and 62(1987)-252407 and the specifications of Japanese Patent Application Nos. 61(1986)-95905 and 61(1986)-95906. For example, copolymerization can be conducted with the use of tetracyclo[4.4.0.1²,⁵.1⁷,¹⁰]-3-dodecene (hereinafter occasionally referred to as "TCD-3") as a cycloolefin in a cyclohexane solvent in the presence of a catalyst composed of $VO(OCH_2CH_3)Cl_2/Al(CH_2CH_3)_{1.5}Cl_{1.5}$ by means of a continuous polymerization reactor under conditions so set that the reaction temperature and reaction time (polymerization reaction residence time) are 10° C. and about 30 min, respectively, thereby obtaining a random copolymer of ethylene/TCD-3.

The cycloolefin ring-opening (co)polymer is a resin obtained by subjecting the cycloolefin represented by the above formula (I) or (II) to ring-opening polymerization or copolymerization.

In the above cycloolefin ring-opening polymer or copolymer, it is believed that at least parts of the cycloolefins represented by the above formulae (I) and (II) form repeating structural units represented by the following formulae (V) and (VI), respectively.

Formula (V)

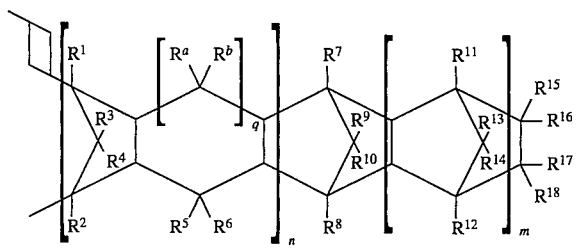

In the above formula (V), n, m, q, $R^1$ to $R^{18}$ $R^a$ and $R^b$ have the same meaning as in the formula (I).

Formula (VI)

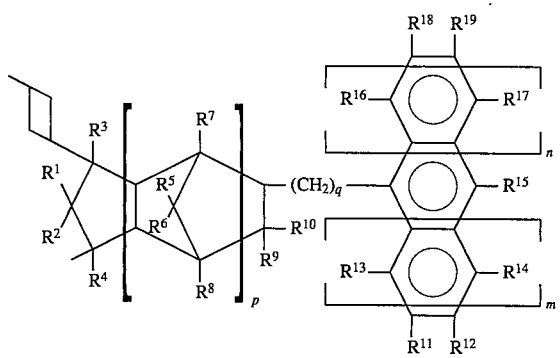

In the above formula (VI), n, m, p, q and $R^1$ to $R^{19}$ have the same meaning as in the formula (II).

The above ring-opening polymer or copolymer can be produced by any of the processes disclosed in the above publications. It can be produced by polymerizing or copolymerizing the cycloolefin represented by the above formula (I) or (II) in the presence of a ring-opening polymerization catalyst.

Examples of suitably employed ring-opening polymerization catalysts include:

a catalyst composed of a halide, nitrate or acetylacetonate of a metal such as ruthenium, rhodium, palladium, osmium, indium or platinum and a reducing agent, and a catalyst composed of a halide or acetylacetonate of a metal such as titanium, palladium, zirconium or molybdenum and an organoaluminum compound.

The product of hydrogenation of the ring-opening (co)polymer can be obtained by hydrogenating the above ring-opening (co)polymer in the presence of any of conventional hydrogenation catalysts.

In the above product of hydrogenation of the ring-opening (co)polymer, it is believed that at least parts of the cycloolefins represented by the above formulae (I) and (II) form repeating structural units represented by the following formulae (VII) and (VIII), respectively.

Formula (VII)

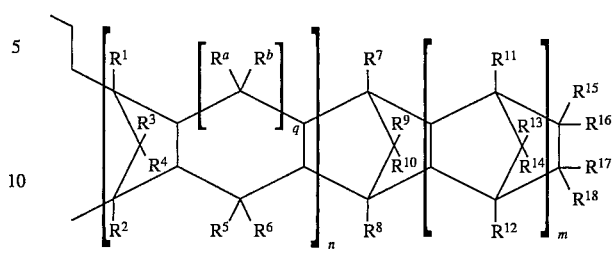

In the above formula (VII), n, m, q, $R^1$ to $R^{18}$, $R^a$ and $R^b$ have the same meaning as in the formula (I).

Formula (VIII)

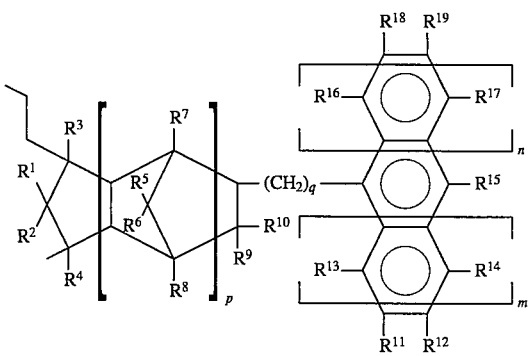

In the above formula (VIII), n, m, p, q and $R^1$ to $R^{19}$ have the same meaning as in the formula (II).

Examples of the above ring-opening polymers, ring-opening copolymers and products of hydrogenation thereof include copolymers obtained by ring-opening copolymerization of tetracyclododecene and norbornene or derivatives thereof and products of hydrogenation of the copolymers.

In the present invention, the cycloolefin-based random copolymer, cycloolefin ring-opening (co)polymer and product of hydrogenation of the cycloolefin ring-opening (co)polymer can be used either individually or in combination.

Each of the above cycloolefin resins may have its part modified with, for example, an unsaturated carboxylic acid such as maleic anhydride. This modification product can be produced by reacting the above cycloolefin resin with an unsaturated carboxylic acid, an anhydride thereof or a derivative of unsaturated carboxylic acid such as an alkyl ester. The ratio of modification of the modified cycloolefin resin is generally not higher than 50 mol %, preferably not higher than 10 mol %.

The modified cycloolefin resin can be produced by conducting a grafting polymerization of a modifier on the above cycloolefin resin. This grafting polymerization can be accomplished, for example, by a method in which the cycloolefin resin is melted, a modifier is added and a grafting polymerization reaction is effected, or by a method in which the cycloolefin resin and a modifier are dissolved in a solvent and a grafting polymerization reaction is effected. In this grafting polymerization, it is preferred that a radical initiator be added. The grafting polymerization is generally conducted at 60° to 350° C.

Alternatively, the above modified cycloolefin resin can be produced by a method in which the cycloolefin resin is blended with a modifier in an amount suitable to achieve a desired ratio of modification followed by grafting polymerization reaction, or by a method in which a modification product of high modification ratio is prepared in advance and the modification product is blended with the unmodified cycloolefin resin.

The cycloolefin resin for use in the present invention has an intrinsic viscosity generally ranging from 0.01 to 20 dl/g, preferably from 0.05 to 10 dl/g and still preferably from 0.08 to 8 dl/g as measured in decalin at 135° C.

The above cycloolefin resin is generally amorphous or lowly crystalline. Amorphousness is preferred.

The crystallization degree of the cycloolefin resin is generally not greater than 5% and preferably 0% as measured by X-ray diffractometry. Many species of the cycloolefin resin have no clearly observable melting point as measured by a differential scanning calorimeter (DSC).

The cycloolefin resin is characterized by its high glass transition temperature (Tg) and softening temperature (TMA). The copolymer of cycloolefin resin has a glass transition temperature (Tg) generally ranging from 50° to 230° C. and preferably from 70° to 200° C. Further, the cycloolefin resin has a softening temperature generally ranging from 70° to 250° C. and preferably from 90° to 220° C.

The thermal decomposition temperature of the cycloolefin resin generally ranges from 350° to 420° C. and often from 370° to 400° C.

With respect to mechanical properties, the cycloolefin resin generally has a flexural modulus ranging from $1 \times 10^4$ to $5 \times 10^4$ Kg/cm$^2$ and a flexural strength ranging from 300 to 1500 Kg/cm$^2$.

The density of the cycloolefin resin per se generally ranges from 0.86 to 1.10 g/cm$^3$ and preferably from 0.88 to 1.08 g/cm$^3$.

In the present invention, the above softening temperature (TMA) was determined by measuring the thermal deformation behavior of a sheet of 1 mm in thickness by the use of Thermomechanical Analyzer (manufactured by E.I. Du Pont De NEMOURS AND COMPANY). Specifically, a quartz needle was fitted to the sheet, a load of 49 g was applied to the quartz needle, the temperature was raised at a rate of 5° C./min, and the temperature at which the needle penetrated in the sheet at a depth of 0.635 mm was detected as TMA.

The unmodified cycloolefin resin and modification product thereof can be used either individually or in combination as the cycloolefin resin in the present invention.

The random copolymer and modification product thereof can be used either individually or in combination.

The resin composition of the present invention comprises the above cycloolefin resin (A) and an oligomer having an alicyclic structure and/or an aromatic ring structure (B). This oligomer having an alicyclic structure and/or an aromatic ring structure (B) has excellent affinity for the cycloolefin resin (A) to thereby be able to form a homogeneous composition therewith. Further, a resin composition obtained by blending the oligomer having an alicyclic structure and/or an aromatic ring structure (B) with the cycloolefin resin (A) has excellent coating and bonding suitabilities.

Examples of the oligomers each having an alicyclic structure and/or an aromatic ring structure (B) for use in the present invention include rosin, terpene, petroleum, xylene, alkylphenol and coumarone-indene resin oligomers.

The softening temperatures of the above oligomers generally range from 50° to 200° C.

Examples of the rosin resin oligomers include gum rosin, wood rosin, tall oil rosin and rosin phenol having been modified with another component. These rosin resin oligomers are light-yellow transparent thermoplastic resins.

Each of the above gum, wood, tall oil and phenyl rosins employed as the rosin resin oligomer in the present invention can be used as it is or can be modified by disproportionation, hydrogenation or esterification prior to use.

The terpene resin oligomer is a resin obtained by cationic polymerization in which turpentine oil composed mainly of α-pinene, β-pinene, dipentene and the like or limonene is used as the starting material and in which aluminum chloride or boron trifluoride is used as a catalyst. Further, use can be made of a phenol terpene resin oligomer obtained by conducting the above polymerization in the presence of phenol or the like, a modified terpene resin oligomer obtained by copolymerization with an aromatic monomer such as styrene and a hydrogenated terpene resin oligomer obtained by hydrogenation of the above terpene resin.

The petroleum resin oligomer is a resin oligomer obtained by cationic polymerization of a fraction containing unsaturated hydrocarbons incidentally produced in the thermal cracking of naphtha as a starting material in the presence of a Friedel-Crafts catalyst.

Examples of the above petroleum resin oligomers include aliphatic petroleum resin oligomers ($C_5$ series), aromatic petroleum resin oligomers ($C_9$ series), petroleum resin oligomers obtained by copolymerization thereof and resin oligomers obtained by hydrogenation of the above oligomers.

The xylene resin oligomer is a resin oligomer obtained from m-xylene and formaldehyde or a resin oligomer prepared by modifying the above xylene resin oligomer with another component.

The alkylphenol resin oligomer is a resin oligomer obtained, for example, by reacting a p-alkylphenol with formaldehyde in the presence of a catalyst, which resin oligomer may be modified with another component.

The coumarone-indene resin oligomer is either a thermoplastic resin oligomer obtained from a solvent naphtha (generally having a boiling point of 150° to 200° C.) contained in light oil of a coke oven gas, as starting material, by copolymerizing coumarone, indene, styrene, etc. which are contained in the starting material, or an oligomer obtained by polymerization of a mixture comprising 5 to 15% by weight of coumarone, 20 to 30% by weight of styrene and 60 to 70% by weight of indene.

In the present invention, it is preferred that the oligomer having an alicyclic structure and/or an aromatic ring structure (B) have at least one polar group selected from the group consisting of phenol, ether, amino, carboxyl, hydroxyl and ester groups.

In the present invention, the above various species of the oligomer having an alicyclic structure and/or an aromatic ring structure (B) can be used either individually or in combination.

In the resin composition of the present invention, generally 0.5 to 50 parts by weight and preferably 5 to 30 parts by weight of the oligomer having an alicyclic structure and/or an aromatic ring structure (B) is blended with 100 parts by weight of the cycloolefin resin (A). When the amount of the oligomer (B) is less than 0.5 part by weight, the final resin composition is likely to have unsatisfactory bonding and coating suitabilities. On the other hand, when the amount of the oligomer (B) exceeds 50 part by weight, the strength of the final resin composition per se is likely to be poor.

The resin composition of the present invention may contain resin components other than the above cycloolefin resin (A) and the oligomer having an alicyclic structure and/or an aromatic ring structure (B).

Examples of the other resins preferably blended in the resin composition of the present invention include a polyamide (C) and/or a soft polymer (D), the incorporation of which favorably improves the impact and chemical resistances of the resin composition.

Preferred examples of the polyamides (C) which can be used in the present invention include nylons 6, 11, 12, 46, 66, 610, 612 and MXD6.

Preferred examples of the soft polymers (D) include rubbery components selected from the following groups (a) to (e).

When a polymer alloy is formed by the cycloolefin resin and the above rubbery component, a crosslinking reaction may be effected in the presence of an organic peroxide. The thus formed crosslinked polymer alloy is excellent in rigidity and impact resistance.

Soft polymer containing cycloolefin component (a)

The soft polymer containing a cycloolefin component is a copolymer obtained by copolymerizing an ethylene component with the same cycloolefin component (represented by the above formula (I) or (II)) as employed in the above cycloolefin resin. This soft polymer (a) comprises the cycloolefin component and the ethylene component as indispensable components. Further, it can comprise an α-olefin component in an amount not detrimental to the object of the present invention. Examples of the suitable α-olefins include propylene, 1-butene, 4-methyl-1-pentene, 1-hexene, 1-octene, 1-decene, 1-dodecene, 1-tetradecene, 1-hexadecene, 1-octadecene and 1-eicocene. Of these, α-olefins each having 3 to 20 carbon atoms are preferred. Moreover, cycloolefins and cyclodienes such as norbornene, ethylidenenorbornene and dicyclopentadiene can also preferably be employed.

In the soft polymer containing a cycloolefin component (a), the ethylene component is contained in an amount generally ranging from 40 to 98 mol %, preferably from 50 to 90 mol %. The α-olefin component is contained in an amount generally ranging from 2 to 50 mol %. The cycloolefin component is contained in an amount generally ranging from 2 to 20 mol %, preferably from 2 to 15 mol %. As different from the above cycloolefin resin, the soft polymer (a) has a glass transition temperature (Tg) generally not higher than 0° C. and preferably not higher than −10° C. Further, it has an intrinsic viscosity (η) generally ranging from 0.01 to 10 dl/g and preferably from 0.8 to 7 dl/g as measured in decalin at 135° C. The crystallization degree of the soft polymer (a) ranges generally from 0 to 10%, preferably from 0 to 7% and still preferably from 0 to 5% as measured by X-ray diffractometry.

The soft polymer (a) can be produced under appropriately selected conditions according to any of the processes proposed by the applicant of the present application as described in the publications of Japanese Patent Laid-open Publication Nos. 60(1985)-168708, 61(1986)-120816, 61(1986)-115912, 61(1986)-115916, 61(1986)-271308, 61(1986)-272216 and 62(1987)-252406.

α-Oefin Copolymer (b)

The α-olefin copolymer (b) used as a soft polymer is composed of at least two α-olefins and is a copolymer which is amorphous or lowly crystalline. Examples thereof include ethylene/α-olefin and propylene/α-olefin copolymers.

The α-olefin composing the ethylene/α-olefin copolymer generally has 3 to 20 carbon atoms, and examples thereof include propylene, 1-butene, 4-methyl-1-butene, 1-hexene, 1-octene and 1-decene and mixtures thereof. Of these, α-olefins each having 3 to 10 carbon atoms are preferred. Although the molar ratio of ethylene/α-olefin of the ethylene/α-olefin copolymer depends on the type of the α-olefin, it generally ranges from 40/60 to 95/5. This molar ratio is preferred to range from 40/60 to 90/10 when the α-olefin is propylene and is preferred to range from 50/50 to 95/5 when the α-olefin has at least 4 carbon atoms.

The α-olefin composing the propylene/α-olefin copolymer generally has 4 to 20 carbon atoms, and examples thereof include 1-butene, 4-methyl-1-butene, 1-hexene, 1octene and 1-decene and mixtures thereof. Of these, α-olefins each having 4 to 10 carbon atoms are preferred.

In the above propylene/α-olefin copolymer, the molar ratio of propylene/α-olefin generally ranges from 50/50 to 95/5 although it depends on the type of the α-olefin.

α-Oefin/Diene Copolymer (c)

Examples of the α-olefin/diene copolymers (c) used as soft polymers include an ethylene/α-olefin/diene copolymer rubber and a propylene/α-olefin/diene copolymer rubber.

The α-olefin composing the above copolymer rubber generally has 3 to 30 carbon atoms (4 to 20 carbon atoms in the use of propylene), and examples thereof include propylene, 1-butene, 1-pentene, 4-methyl-1-pentene, 1-hexene, 1-octene and 1-decene and mixtures thereof. Of these, α-olefins each having 3 to 10 carbon atoms are preferred.

Examples of the dienes each as a structural component of the above copolymer rubber include:

chain nonconjugated dienes such as 1,4-hexadiene, 1,6octadiene, 2-methyl-1,5-hexadiene, 6-methyl-1,5-heptadiene and 7-methyl-1,6-octadiene;

cyclic nonconjugated dienes such as cyclohexadiene, dicyclopentadiene, methyltetrahydroindene, 5vinylnorbornene, 5-ethylidene-2-norbornene, 5-methylene-2norbornene, 5-isopropylidene-2-norbornene and 6-chloromethyl-5-isopropenyl-2-norbornene; and 2,3-diisopropylidene-5-norbornene, 2-ethylidene-3-isopropylidene-5-norbornene and 2-propenyl-2,2norbornadiene.

In the above ethylene/α-olefin/diene copolymer rubber, the molar ratio of ethylene/α-olefin generally ranges from 40/60 to 90/10 although it depends on the type of the α-olefin.

The content of repeating units derived from the diene component in the above copolymer rubber is in the range of generally 1 to 20 mol % and preferably 2 to 15 mol %.

Aromaic Vinyl Hydrocarbon/Conjugated Diene Soft Copolymer (d)

The aromatic vinyl hydrocarbon/conjugated diene soft copolymer employed as a soft polymer is specifically a random or block copolymer of an aromatic vinyl hydrocarbon and a conjugated diene or a hydrogenation product thereof. Examples of such soft copolymers suitable include styrene/butadiene block copolymer rubber, styrene/butadiene/styrene block copolymer rubber, styrene/isoprene block copolymer rubber, styrene/isoprene/styrene block copolymer rubber, hydrogenated styrene/butadiene/styrene block copolymer rubber, hydrogenated styrene/isoprene/styrene block copolymer rubber and styrene/butadiene random copolymer rubber.

In each of the above copolymer rubbers, generally, the molar ratio of aromatic vinyl hydrocarbon/conjugated diene ranges from 10/90 to 70/30. The above hydrogenated copolymer rubber means a copolymer rubber resulting from hydrogenation of part or all of the double bonds remaining in the above copolymer rubber.

Soft Polymer or Copolymer Formed from
Isobutylene or Isobutylene/Conjugated Diene (e)

Examples of the isobutylene-based soft polymers or copolymers (e) used as soft polymers include polyisobutylene rubber, polyisoprene rubber, polybutadiene rubber and isobutylene/isoprene copolymer rubber.

The properties of the soft copolymers (b) to (e) are similar to those of the cycloolefin-based soft polymer (a). Their intrinsic viscosities (η) generally range from 0.01 to 10 dl/g and preferably from 0.08 to 7 dl/g as measured in decalin at 135° C. Their glass transition temperatures (Tg) are generally not higher than 0° C., preferably not higher than −10° C. and still preferably not higher than −20° C. Their crystallization degrees as measured by X-ray diffractometry range generally from 0 to 10%, preferably from 0 to 7% and still preferably from 0 to 5%.

The above soft polymer per se can be kneaded together with the cycloolefin resin and used in the present invention. Alternatively, the soft polymer as the other resin is dispersed in the cycloolefin resin to thereby obtain polymer particles, to which an organic peroxide is added and kneaded together, so that a crosslinked structure can be formed.

Examples of the suitably employed organic peroxides include ketone peroxides such as methyl ethyl ketone peroxide and cyclohexanone peroxide; peroxyketals such as 1,1-bis (t-butylperoxy) cyclohexane and 2,2-bis (t-butylperoxy)octane; hydroperoxides such as t-butyl hydroperoxide, cumene hydroperoxide, 2,5-dimethylhexane-2,5-dihydroperoxide and 1,1,3,3-tetramethylbutyl hydroperoxide; dialkyl peroxides such as di-t-butyl peroxide, 2,5-dimethyl-2,5-di(t-butylperoxy)hexane and 2,5-dimethyl-2,5-di(t-butylperoxy)hexyne-3; diacyl peroxides such as lauryl peroxide and benzoyl peroxide; and peroxy esters such as t-butyl peroxyacetate, t-butyl peroxybenzoate and 2,5-dimethyl-2,5-di(benzoylperoxy)hexane.

The above organic peroxide is added in an amount generally ranging from 0.01 to 1 part by weight and preferably from 0.05 to 0.5 part by weight per 100 parts by weight of the total of the cycloolefin resin and soft polymer.

The further addition of a compound having at least two radically polymerizable functional groups in each molecule at the treatment with the organic peroxide for the purpose of increasing the crosslinking efficiency improves the impact resistance of the final resin composition.

Examples of the compounds each having at least two radically polymerizable functional groups in each molecule include divinylbenzene, vinyl acrylate and vinyl methacrylate. Each of these compounds is added in an amount generally not greater than 1 part by weight and preferably ranging from 0.1 to 0.5 part by weight per 100 parts by weight of the total of the cycloolefin resin and soft polymer.

With respect to the polymer alloy and organic-peroxide-treated crosslinked polymer alloy which contain respective soft polymers (rubbery components), the addition of the soft polymer (a) to (e) in an amount ranging generally from 5 to 150, preferably from 5 to 100 and still preferably 10 to 80 parts by weight per 100 parts by weight of the cycloolefin resin enables production of a polymer alloy well balanced in properties such as impact strength, rigidity, heat distortion temperature and hardness.

It is preferred that the melt flow index (MRF: measured under conditions prescribed in ASTM-D 1238) of the above polymer alloy ranges from 0.1 to 100.

The above polyamide (C) and soft polymer (D) can be used either individually or in combination.

In the use of the above polyamide (C) or olefinic elastic copolymer (D), it is added in an amount ranging generally from 5 to 200 and preferably from 30 to 150 parts by weight per 100 parts by weight of the cycloolefin resin (A).

The resin composition of the present invention which comprises the cycloolefin resin (A) and oligomer having an alicyclic structure and/or an aromatic ring structure (B) optionally together with the other resins (C) and (D) may further contain other additives in amounts not detrimental to the properties of the resin composition of the present invention.

Examples of the additives which can suitably be added to the resin composition of the present invention include a heat resisting stabilizer, a weatherproof stabilizer, an antistatic agent, a slip agent, an antiblocking agent, an antifogging agent, a lubricant, a dye, a natural oil, a synthetic oil and a wax.

Examples of stabilizers added as optional components include:

phenolic antioxidants such as tetrakis[methylene-3-(3,5-di-tert-butyl-4-hydroxyphenyl) propionate]methane, alkyl β-(3, 5-di-tert-butyl-4-hydroxyphenyl)propionate and 2,2'-oxamidebis[ethyl-3(3, 5-di-tert-butyl-4-hydroxyphenyl)]propionate;

organophosphite stabilizers such as trioctyl phosphite, trilaurylphosphite, tridecyl phosphite, octyl diphenyl phosphite and tris(2,4-di-tert-butylphenyl) phosphite;

fatty acid metal salts of such as zinc stearate, calcium stearate and calcium 12-hydroxystearate, polyhydric alcohol fatty acid esters, for example, glycerol fatty acid esters such as glycerol monostearate, monolaurate, monomyristate, monopalmitate, distearate and dilaurate; and pentaerythritol fatty acid esters such as pentaerythritol monostearate, distearate, monolaurate, dilaurate and tristearate.

These may be added either individually or in combination. For example, a mixture of tetrakis[methylene-3-(3,5-di-tert-butyl-4-hydroxyphenyl)propionate]-methane, tris(2, 4-di-tert-butylphenyl) phosphite, zinc stearate and glycerol monostearate can be added to the resin composition.

The above phenolic antioxidant is added in an amount ranging generally from 0 to 10, preferably from 0.01 to 5 and still preferably 0.05 to 2 parts by weight per 100 parts by weight of the total of cycloolefin resin (A) and the oligomer having an alicyclic structure and/or an aromatic ring structure (B). The organophosphite stabilizer is added in an amount ranging generally from 0 to 10, preferably from 0.01 to 5 and still preferably 0.05 to 2 parts by weight per 100 parts by weight of the total of cycloolefin resin (A) and the oligomer having an alicyclic structure and/or an aromatic ring structure (B). The fatty acid metal salt is added in an amount ranging generally from 0 to 10, preferably from 0.01 to 5 and still preferably 0.05 to 2 parts by weight per 100 parts by weight of the total of cycloolefin resin (A) and the oligomer having an alicyclic structure and/or an aromatic ring structure (B). The polyhydric alcohol fatty acid ester is added in an amount ranging generally from 0 to 10 and preferably from 0.05 to 5 per 100 parts by weight of the total of cycloolefin resin (A) and the oligomer having an alicyclic structure and/or an aromatic ring structure (B).

Furthermore, in the present invention, a filler such as silica, diatom earth, alumina, titanium oxide, magnesium oxide, pumice powder, pumice balloon, aluminum hydroxide, magnesium hydroxide, basic magnesium carbonate, dolomite, calcium sulfate, potassium titanate, barium sulfate, calcium sulfite, talc, clay, mica, asbestos, glass fiber, glass flake, glass bead, calcium silicate, montmorillonite, bentonite, graphite, aluminum powder, molybdenum sulfide, boron fiber, silicon carbide fiber, polyethylene fiber, polypropylene fiber, polyester fiber and polyamide fiber can be added to the resin composition of the present invention in an amount not detrimental to the properties thereof.

These fillers are added in an amount generally ranging from 0.1 to 100 parts by weight per 100 parts by weight of the resin components composing the resin composition of the present invention.

The resin composition of the present invention can be produced by melt kneading the cycloolefin resin (A) and the oligomer having an alicyclic structure and/or an aromatic ring structure (B) together with the other resins and components added according to necessity.

The resin composition of the present invention can be molded into a shaped article by the use of any of various molding techniques such as injection molding, melt extrusion molding (e.g., film extrusion, sheet extrusion, pipe extrusion, monofilament extrusion and blow molding), calendering and heat forming (e.g., vacuum forming).

The thus obtained shaped article exhibits improved adhesions between the surface thereof and the coating and adhesive applied thereto because of the incorporation of the oligomer having an alicyclic structure and/or an aromatic ring structure (B) into the cycloolefin resin (A). In particular, the use of the resin composition of the present invention ensures highly improved adhesions with such coating and adhesive compositions as cure with reaction on the object surface, for example, urethane, urea and epoxy coating and adhesive compositions.

Accordingly, for example, urethane, urea and epoxy resin coating and adhesive compositions can directly be applied to the surface of a shaped article composed of the resin composition of the present invention without the need of using a special primer or the like.

The resin composition of the present invention can be molded into, for example, the following shaped articles:

(1) Automobile parts such as an installment panel, a console box, a meter cluster, a column cover, a grille door mirror, a fender, a bonnet, a radiator grille, an air spoiler and a wheel cap, (2) Mechanical housings and panels such as tools (power tool), business machines (a word processor, a personal computer, a copier, a printer, FDD and CRT), precision equipment (camera), household appliances (a microwave range, an electric oven, a refrigerator, a pot and a cleaner) and various construction panels, and (3) Mechanical parts such as a sirocco fan for air conditioner.

EFFECT OF THE INVENTION

The resin composition of the present invention has markedly improved affinities for coating and adhesive compositions because it comprises the cycloolefin resin (A) and the oligomer having an alicyclic structure and/or an aromatic ring structure (B). In particular, the resin composition of the present invention has excellent affinities for such resin coating and adhesive compositions as cure with reaction upon being applied, for example, urethane, urea and epoxy resin coating and adhesive compositions.

The resin composition of the present invention retains the excellent properties of the cycloolefin resin without any deterioration while it possesses excellent affinities for coating and adhesive compositions as mentioned above.

Therefore, the resin composition of the present invention endows the cycloolefin resin with excellent coating and bonding suitabilities without detriment to the properties such as heat resistance, heat aging resistance, weather resistance and mechanical characteristics inherently possessed by the cycloolefin resin.

EXAMPLE

The present invention will be illustrated in greater detail below with reference to the following Examples, which in no way limit the scope of the invention.

The measurements of various properties and evaluations were conducted in the present invention by the following methods.

(1) Measurement of mechanical strength (units are shown in the table and thus omitted at this part)

(a) Flexural modulus measured at 23° C. in accordance with the method of ASTM-D790.

(b) Flexural strength measured at 23° C. in accordance with the method of ASTM-D790.

(c) Izod impact strength (notched)

measured at 23° C. in accordance with the method of ASTM-D256.

(2) Evaluation of coating suitability

Two-pack acrylic urethane coating composition "Planet PH-2" (trade name, produced by Origin Electric Co., Ltd.) was applied by means of an air spray to an injection-molded test piece of 120 mm×130 mm×3 mm (thickness) having no primer applied thereto so that a film of 20 μm in thickness was obtained. The coated test piece was allowed to stand still at room temperature for 10 min, baking was performed in an air oven at 80° C. for 30 min, and the resultant coating film was subjected to the conventional cross-cut adhesion test.

EXAMPLE 1

The following materials were provided:

(A) 3.4 kg of pelletized cycloolefin resin (intrinsic viscosity ($\eta$)=0.6 dl/g, Tg=122° C., MFR$_{260°\ C}$=15 g/min, TMA=138° C., random copolymer of ethylene and tetracyclo[4.4.0.1$^{2,5}$.1$^{7,10}$]-3-dodecene (TCD-3), ethylene content=66 mol %), (C) 0.6 kg of pelletized lowly crystalline α-olefin copolymer (ethylene/propylene random copolymer, ethylene content=80 mol % intrinsic viscosity ($\eta$)=2.2 dl/g, Tg=–54° C. MFR$_{230°\ C.}$=0.7 g/min) and (B) 1.7 kg of phenyl-containing terpene resin (trade name "Mightyace", produced by Yasuhara Chemical).

The above materials (A), (B) and (C) were satisfactorily mixed together, melt blended by twin-screw extruder (PCM-45 manufactured by Ikegai Corp.) at a cylinder temperature of 220° C. and pelletized by a pelletizer.

The thus obtained pellets were injection molded under the following conditions into test pieces for use in property measurement and coating suitability evaluation.

The properties, viz., flexural modulus, flexural strength and Izod impact strength (notched) measured and the coating suitability evaluated with the use of the above test pieces are given in Table 1.

Molding conditions injection molding machine: IS-50EP manufactured by Toshiba Machine Co., Ltd., cylinder temperature: 250° C., metal mold temperature: 80° C., injection pressure: first/second=1000/8000 Kg/cm², and injection speed: middle speed.

EXAMPLE 2

1 g of 2,5-dimethyl-2,5-di(t-butylperoxy)hexyne-3 (trade name "Perhexyne 25B" produced by Nippon Oil & Fats Co., Ltd.) and 3 g of divinylbenzene were added per kg of the pellets obtained in Example 1, and satisfactorily mixed together. This mixture was melted and reacted under molten conditions in the twin-screw extruder at a cylinder temperature of 230° C. and pelletized by a pelletizer.

The thus obtained pellets were molded into test pieces under the same molding conditions as in Example 1.

The properties, viz., flexural modulus, flexural strength and Izod impact strength (notched) measured and the coating suitability evaluated with the use of the above test pieces are given in Table 1.

Production Example 1

(Preparation of graft-modified cycloolefin addition polymer (a))

10 g of maleic anhydride and 2 g of 2,5-dimethyl-2,5-di(t-butylperoxy)hexyne-3 (trade name "Perhexyne 25B" produced by Nippon Oil & Fats Co., Ltd.) were mixed with 1 kg of random copolymer of ethylene/TCD-3 having an intrinsic viscosity (η) of 0.5 dl/g as measured in decalin at 135° C. and having a TMA of 150° C. The obtained mixture was melt kneaded at 260° C. by means of a vented twin-screw extruder of 30 mm in diameter, thereby obtaining a graft-modified cycloolefin addition polymer.

The amount of maleic anhydride addition (degree of modification) of the obtained graft-modified cycloolefin addition polymer was 0.83% by weight.

PRODUCTION EXAMPLE 2

(Preparation of graft-modified elastomer (c))

10 g of maleic anhydride and 2 g of 2,5-dimethyl-2,5-di(t-butylperoxy)hexyne-3 were mixed with 1 kg of an ethylene/propylene copolymer having an intrinsic viscosity (η) of 2.2 dl/g as measured in decalin at 135° C. and having an ethylene content of 80 mol %. The obtained mixture was melt kneaded at 260° C. by means of a vented twin-screw extruder of 30 mm in diameter, thereby obtaining a graft-modified elastomer.

The amount of maleic anhydride addition (degree of modification) of the obtained graft-modified elastomer was 0.90% by weight.

EXAMPLE 3

3.0 kg of graft-modified ethylene/cycloolefin addition polymer (a) obtained in Production Example 1 and 1.5 kg of graft-modified elastomer (c) obtained in Production Example 2 were melt kneaded at 230° C. by means of a vented twin-screw extruder of 30 mm in diameter, thereby preparing a precursor blend.

Subsequently, 4.5 kg of nylon 6 (trade name "Amitan CM1007" produced by Toray Industries, Inc.) as a polyamide resin, 4.5 kg of the above precursor blend and 1.0 kg of phenyl-containing terpene resin (trade name "Mightyace", produced by Yasuhara Chemical) were kneaded at 250° C. by the use of the above extruder, thereby obtaining a cycloolefin resin composition.

This resin composition was dried at 100° C. for 8 hr and subjected to preparation of test pieces under the same conditions as in Example 1 except that the temperature of the metal mold was changed to 60° C.

The properties, viz., flexural modulus, flexural strength and Izod impact strength (notched) measured and the coating suitability evaluated with the use of the above test pieces are given in Table 1.

COMPARATIVE EXAMPLE 1

A resin composition was prepared by the same procedure as in Example 2 except that the phenyl-containing terpene resin (B) was not used, and test pieces were prepared therefrom.

The coating suitability evaluated with the use of the above test pieces are given in Table 1.

COMPARATIVE EXAMPLE 2

A resin composition was prepared by the same procedure as in Example 3 except that the phenyl-containing terpene resin (B) was not used, and test pieces were prepared therefrom.

The properties, viz., flexural modulus, flexural strength and Izod impact strength (notched) measured and the coating suitability evaluated with the use of the above test pieces are given in Table 1.

TABLE I

| | Flexural modulus (Kg/cm²) | Flexural strength (Kg/cm²) | Izod impact strength (Kg – cm/cm) | Coating suitability |
|---|---|---|---|---|
| Example 1 | 23400 | 920 | 7 | fair |
| Example 2 | 22500 | 830 | 18 | fair |
| Example 3 | 21500 | 860 | 20 | excellent |
| Comp. Ex. 1 | — | — | — | poor |
| Comp. Ex. 2 | 16600 | 690 | 60 | poor |

What is claimed is:

1. A resin composition comprising:

(A) at least one cycloolefin resin selected from the group consisting of:

a random copolymer of a cycloolefin represented by the following formula (I) or (II) and ethylene, a (co)polymer obtained by a ring-opening polymerization of a cycloolefin represented by the following formula (I) and (II) and a product of hydrogenation of said ring-opening (co)polymer, and (B) at least one oligomer having an alicyclic structure and/or an aromatic ring structure selected from the group consisting of rosin resin oligomers, terpene resin oligomers, petroleum resin oligomers, xylene resin oligomers, alkylphenol resin oligomers and coumarone-indene resin oligomers;

Formula (I)

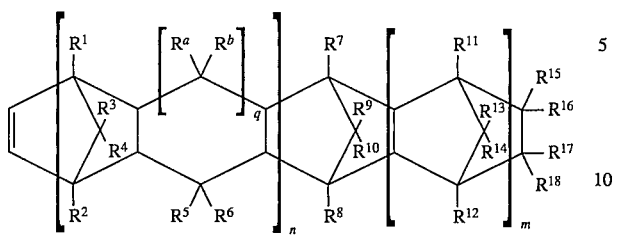

wherein n is 0 or 1, m is 0 or a positive integer, q is 0 or 1 and each of $R^1$ to $R^{18}$, $R^a$ and $R^b$ independently represents a hydrogen atom, a halogen atom or a hydrocarbon group, provided that $R^{15}$ to $R^{18}$ may mutually bond to form a monocyclic or polycyclic ring structure which may contain a double bond, and that a combination of $R^{15}$ and $R^{16}$, or a combination of $R^{17}$ and $R^{18}$ may form an alkylidene group; or Formula (II)

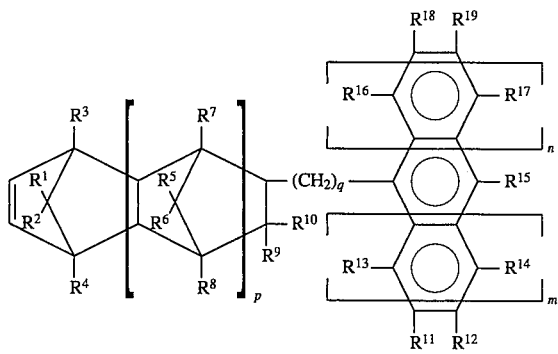

wherein each of p and q is 0 or an integer of 1 or greater, each of m and n is 0, 1 or 2 and each of $R^1$ to $R^{19}$ independently represents a hydrogen atom, a halogen atom, an aliphatic hydrocarbon group, an alicyclic hydrocarbon group, an aromatic hydrocarbon group or an alkoxy group, provided that a carbon atom with which $R^9$ and $R^{10}$ bond and either a carbon atom with which $R^{13}$ bonds or a carbon atom with which $R^{11}$ bonds may bond with each other directly or through an alkylene group having 1 to 3 carbon atoms and that, when n=m=0, a combination of $R^{15}$ and $R^{19}$ may mutually bond to form a monocyclic or a polycyclic aromatic ring.

2. The composition of claim 1, wherein the oligomer (B) has at least one polar group selected from the group consisting of phenol, ether, amino, carboxyl, hydroxyl and ester groups.

3. The composition of claim 1, wherein the oligomer (B) is at least one adhesive resin oligomer selected from the group consisting of rosin resin oligomers, terpene resin oligomers, petroleum resin oligomers and xylene resin oligomers.

4. The composition of any one of claims 1 to 3, which contains 0.5 to 50 parts by weight of the oligomer (B) per 100 parts by weight of the cycloolefin resin (A).

5. The composition of claim 1, which further comprises a polyamide (C) and/or a soft polymer (D).

* * * * *